Patented July 3, 1951

2,559,440

UNITED STATES PATENT OFFICE 2,559,440

ESTER-AMIDES OF AMINO-HYDROXY COMPOUNDS AND DERIVATIVES THEREOF

Wesley A. Jordan and Sydney H. Shapiro, Chicago, Ill., assignors to Armour and Company, Chicago, Ill., a corporation of Illinois No Drawing. Application July 12, 1944,
Serial No. 544,628

8 Claims. (Cl. 260—404.5)

This invention relates to the ester-amides of amino-hydroxy compounds such as the ester-amides of trishydroxymethylaminomethane and to derivatives of such compounds, particularly the aldehyde derivatives. The invention further deals with coating compositions and resinous products involving the improved ester-amide compounds.

A general object of the present invention is to provide compounds which have great usefulness in the field of protective coatings and which enable the preparation of varnishes, enamels and the like having greatly improved characteristics.

An important object of the invention is to provide coating materials which, when applied as films, are very resistant to weathering influences and exposure. Another object is to provide coating materials which will dry very rapidly and give hard films without sacrifice in film flexibility. Yet another important object is to provide coating materials which will yield films having high resistance to water and alkalies.

Though in the past some coating materials have possessed some of the above mentioned qualities in a fair degree and other known materials have possessed other of these qualities, none of the materials heretofore known have excelled in all of the desired characteristics. Therefore, we have sought materials which have all of these important characteristics, namely, rapid drying, hardness, resistance to water and alkalies, durability to exposure, and which possess each of these characteristics in a degree not heretofore known.

Another feature of the invention is the combination of our newly discovered compounds with other substances such as resins or the like to prepare products having unexpected qualities. For example, it is desired to prepare improved varnishes wherein the new compounds contribute to desirable characteristics through their special action on the varnish resins.

Another feature of the invention involves application of the improved materials as multiple coatings which are specially secured with each other.

The compositions in which the new compounds are applied and also the special coatings are further features of the invention. Other objects, features and advantages will be apparent as the specification proceeds.

In some respects this invention may be considered an improvement on the inventions set forth in our co-pending applications, Serial Numbers 500,692 and 509,798 filed August 31, 1943, and November 10, 1943, respectively, each now abandoned. In these prior applications we described the ester-amides of amino-hydroxy compounds and set forth methods for their preparation.

These ester-amides may be prepared by heating an amino-hydroxy compound with an organic carboxylic substance to a temperature and for a time sufficient to react both the hydroxy and amino groups. A preferred practice is to heat these reactants to about 150° C. for 20 or 30 minutes, then to 175° or 180° C. for an hour or more and then to 230° or 250° C. for several hours.

The reaction between the amino-hydroxy compound and the organic carboxylic substance results in the formation of ester-amides. We have now discovered that a substantial part of the ester-amide reaction product so obtained consists of ester-amide ethers containing the characteristic grouping:

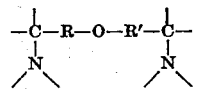

where R and R' are organic structures, usually alkyl chains. It will be seen that this grouping contains the ether linkage:

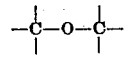

In the synthesis of the ethers more than one molecule of the amino-hydroxy compound is involved in the formation of the ester-amide molecular structure. Usually the ester-amide ethers constitute a major portion of the ester-amide product.

Using trishydroxymethylaminomethane and an aliphatic acid we may illustrate the reaction for the formation of the ester-amide ethers as follows:

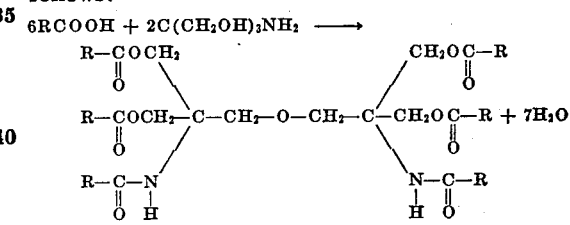

It is understood that all of the specific amino-hydroxy compounds and all of the organic carboxylic substances which are set forth in our co-pending applications first referred to may also be employed in practicing the improvements of the present invention. Thus, among the amino-hydroxy compounds which may be employed are the following: Monoethanolamine; diethanol amine; aminoethylethanol amine; N-phenyl-ethanol amine; 2,amino-1, butanol; 2,amino-2, methyl-1, propanol; 2, amino-2, methyl-1, 3, propanediol; 2, amino-2, ethyl-1, 3, diaminoisopropanol; aminoisopropanol; 1, amino-2, 3, propanediol; 2 aminopropanediol; 2, 3, diaminopropanol; p-aminobenzyl alcohol; B amino B' hydroxy diethyl ether; m-aminophenylethanol; bis, p-aminophenylmethanol; 1, hydroxy-6, aminohexane; and 1, hydroxy -10, aminodecane. However, we regard the improvements of the present invention as especially important when using trishydroxymethylaminomethane as one of the initial reactants.

By the term "organic carboxylic substance," we mean to include organic acids and their derivatives, such as their acid halides, their acid amides and their methyl, ethyl, n-propyl, or n-butyl esters. As examples of the organic carboxylic materials which may be reacted with the amino-hydroxy compounds according to our invention, we may mention the following: saturated straight chain aliphatic acids, such as acetic acid, palmitic acid and stearic acid; unsaturated mono ethylenic aliphatic acids, such as oleic acid and palmitoleic acid; unsaturated polyethylenic aliphatic acids, such as linoleic acid, linolenic acid, elaeostearic acid, and the highly unsaturated acids of 20 and 22 carbons found principally in marine oils; saturated cyclic acids, such as cyclohexane carboxylic acid; heterocyclic acids, such as furoic acid; aromatic acids, such as benzoic acid, toluic acid; aromatic-heterocyclic acids such as coumarin-3-carboxylic acid; dibasic acids, such as succinic and phthalic acid, and ethylenic dibasic acids, as, for example, maleic acid; substituted aliphatic acids, such as amino acids, sulfonic acids, chloracetic acid, and dimer acids such as those derived from linoleic or linolenic acids or fatty acid mixtures.

The above listed substances are given by way of example of the types which may be used and are not intended as a complete list. We may also use the acid halides, the amides, or the methyl, ethyl, n-propyl or n-butyl esters of any of the acids above listed.

We find that the ester-amides of the amino-hydroxy compounds are particularly valuable where the amide groups and preferably also the ester groups each contain a carbon chain having double bonds in conjugated relation, and this may be accomplished in the reaction of the amino-hydroxy compound with an organic carboxylic substance by choosing a carboxylic substance having such an unsaturated conjugated carbon chain, for example, as eleaostearic acid or the product resulting from the dehydration of castor oil.

We have now discovered that greatly improved products may be obtained by reacting the ester-amides of the amino-hydroxy compounds with an aldehyde, and that the derivative products so formed are extremely valuable as coating compositions.

In this reaction we can use any aldehyde. Of those particularly useful we may mention paraformaldehyde, formaldehyde, formaldehyde-releasing substances such as hexamethylenetetramine, paraldehyde, aldol, glyoxal, formisobutyraldol, furfural, acrylic aldehyde, and aldehydic sugars, paraformaldehyde being of special importance and especially valuable in connection with the ester-amides of trishydroxymethylaminomethane. For convenience, paraformaldehyde is preferred rather than formaldehyde, the latter being a gas and hence more difficult to handle.

The amount of the aldehyde used should preferably be slightly in excess of the calculated amount necessary for reaction by addition with the amide group of the ester-amide, though a lesser amount will contribute some improvement in the final product, and greater quantities may be used but to no special advantage.

In carrying out the improved process, fatty acids may be placed in a reaction kettle equipped with an external heating jacket and means for agitation, and heated to about 150° C. Unless the fatty acids are freshly distilled it is advantageous to purge the acids during the heating period with inert gas introduced at the bottom of the kettle.

The amino-hydroxy compound may be slowly added to the hot fatty acids and these reactants slowly heated to about 220° or 230° C., holding this temperature for an hour or more, preferably two or three hours, to complete the formation of the ester-amide. It is preferable to maintain an inert gas blanket over the reactants at all times. Alternatively, a reduced pressure may be employed.

The ester-amide so prepared may then be cooled to around 80° C. by admitting cold liquid medium into the heating chamber. The aldehyde, which may be in an amount of from 2 to 5% of the ester-amide, is then added, the agitator of the kettle being operated to aid in dispersing the aldehyde throughout the mass. Preferably, the mixture is then maintained at about 100° C. until a clear solution results. The reactants may then be heated to about 200° or 225° C. Though reaction is obtained at lower temperatures such as about 150° C. the best results are obtained when the temperature is taken to about 200° or 225° C. Also, for best results we prefer to heat the mass slowly to this temperature, allowing about ½ hour to 1 hour to reach this maximum temperature, and we prefer to hold the mass at 200° or 225° C. for about ¼ hour or more. We prefer to reduce the pressure after attaining a temperature of about 175° C.

The products so prepared may be used as coating compositions and may be compounded with resins and thinners to prepare varnishes, or may be otherwise used as drying compositions, or for other purposes.

The above described procedure may be varied in many ways. For example, if the fatty acids employed are freshly distilled, the amino-hydroxy compound may be added to the cold fatty acid and the mixture then slowly heated to around 150° C.

Also, it is possible to treat the reacting substance with the aldehyde simultaneously as the ester-amide is being synthesized. This is more practicable when the aldehyde used is slower in reaction. Formisobutyraldol, for example, is comparatively slow to react and works especially well when reacted as the ester-amide is being synthesized. In this procedure the aldehyde may be added to the mixture of the amino-hydroxy compound and fatty acid before the ester-amide is formed. The fatty acid blocks the amino group by forming an addition product immediately upon mixing, and as the temperature is advanced the ester-amide is formed. Immediately upon formation of the ester-amide the aldehyde, such as formisobutyraldol, reacts with the amide linkage resulting in an aldehyde-treated ester-amide compound. Other aldehydes which are relatively slow to react and may be effectively used in this way are paraldehyde, glyoxal and pentaerythrose.

As previously indicated, the reaction between the ester-amide and the aldehyde takes place at the amide group and it is the modified amide group which contributes improved properties to the ester-amide compound.

Lower temperatures favor the reaction involving addition at the amide group, and this may be illustrated schematically by the following equation:

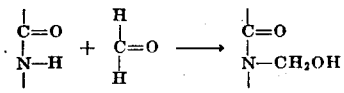

The addition product so formed condenses at higher temperatures as schematically illustrated by the following equation:

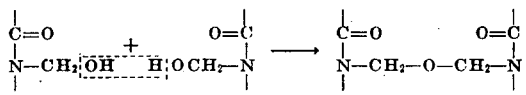

Introduction of an aldehyde at higher temperatures favors immediate condensation reaction schematically illustrated by the following equation:

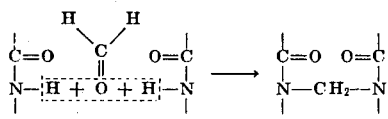

or by the equation:

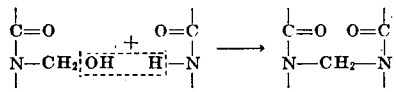

By either of the mechanisms above described the resulting compounds have a $CH_2$ radical attached to the nitrogen atom of the amide group. In the reaction involving condensation of preformed addition structures the resulting product contains an ether linkage and this ether linkage is believed responsible for some of the better results obtained when the temperature of the reactants is raised slowly.

When the organic carboxylic substance and the amino-hydroxy compound are reacted to form the ester-amide ethers as heretofore described, and the ester-amide ether is modified by reaction with an aldehyde at slowly increased temperatures as herein set forth, the resulting product contains both the group:

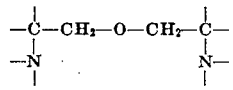

and the group:

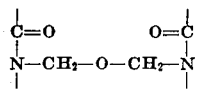

each of which includes the ether linkage:

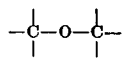

Such compounds contain more than one ether group and may be termed polyethers.

The products resulting from the aldehyde treatment of the ester-amides are excellent coating composition materials. As compared with the ester-amides, which are themselves good coating materials, the treated products require less time to body, dry faster, have superior water and alkali resistance and exhibit greater durability. Each of the treated products when combined with resin and solvent in the preparation of a varnish will make a substantially better varnish than the corresponding untreated products.

Though the foregoing improvements are obtained in connection with any of the ester-amides of amino-hydroxy compounds obtained by the reaction of any organic carboxylic acid and any amino-hydroxy substance such as 1-amino,2-3 propanediol, hydroxyethylethylenediamine, diethanolamine and 1-3, diaminopropanol-2, and by the use of any aldehyde, we will first illustrate these advantages and outline specific practices of the process, for purposes of simplicity, only in connection with the paraformaldehyde treatment of the linseed ester-amides of trishydroxymethylaminomethane.

EXAMPLE I 1000 pounds of linseed fatty acids are placed in a closed, jacketed kettle equipped with a turbo agitator. Dowtherm vapor is admitted to the jacket of the kettle and inert gas is admitted through a perforated ring in the bottom of the kettle. By application of the Dowtherm fluid, the fatty acid is heated to 150° C. in ¾ hour. During this time inert gas is blown through the fatty acid and permitted to escape through a vent at the top of the kettle. Purging is decreased to a point where only a blanket is maintained.

To the hot fatty acid is added 144 pounds of trishydroxymethylaminomethane over a period of 15 to 20 minutes, this rate of addition being helpful in avoiding excessive foaming. The mixture of trishydroxymethylaminomethane and fatty acids is then slowly heated over a period of 3 hours to 220° C. The temperature is then advanced to 230° C. in the course of one hour and is held at this temperature for two hours. At the end of this heating time the acid value of the oil is 2-5.

The contents in the vessel are then cooled to 80° C. by admitting cool Dowtherm liquid to the heating chamber. The weight of ester-amide in the kettle is 1070 pounds.

To the 1070 pounds of ester-amide is added 53½ pounds of paraformaldehyde and the agitator is rotated to aid dispersion of the aldehyde. The temperature is raised to 100° C. and held for two hours. The contents are then slowly heated over a period of one hour to 175° C. The pressure is then reduced to about 10 mm. of mercury and the temperature raised to 200° C. and held at this temperature for ½ hour, at the end of which time the preparation of the improved ester-amide product is completed and the product is ready for use in paints and varnishes, etc.

The effect of certain variations in the proportion of aldehyde is shown by the following example:

EXAMPLE II

An ester-amide oil is prepared using linseed oil fatty acids and trishydroxymethylaminomethane, the trishydroxymethylaminomethane being used in the amount of 13.48% of the weight of the linseed fatty acids.

The oil so prepared is divided into 7 lots. One of these lots is not treated with aldehyde but is held as a control and the other lots are separately treated with 2%, 3%, 4%, 5%, 10% and 15%, respectively, of paraformaldehyde. In treating each of these separate lots the heating schedule is as follows:

Heat to 100° C. in 10 minutes, hold 10 minutes;
Heat to 110° C. in 2 minutes, hold 10 minutes;
Heat to 120° C. in 2 minutes, hold 20 minutes;
Heat to 130° C. in 2 minutes, hold 20 minutes;
Heat to 140° C. in 2 minutes, hold 10 minutes;
Heat to 150° C. in 2 minutes, hold 20 minutes;
Heat to 225° C. in 5 minutes, hold 15 minutes.

Each portion is tested for viscosity and acid value, and subjected to the Brown heat test for determination of the gelling properties. The results of this test are given in the following table:

*Table 1*

| Portion Number | Per cent of Aldehyde | Minutes to Gel at 310° C. | Original Viscosity of Oil (Gardner-Holdt) | Acid Value of Oil |
|---|---|---|---|---|
| 1 (Untreated) | 0 | 385 | B–C | 9.8 |
| 2 | 2 | 121 | D | 11.7 |
| 3 | 3 | 72 | D | 12.4 |
| 4 | 4 | 40 | E | 12.4 |
| 5 | 5 | 28 | E | 12.7 |
| 6 | 10 | 27 | E | |
| 7 | 15 | 27 | E–F | |

From the above table it is seen that substantially better results with respect to gelation are obtained with greater amounts of aldehyde up to about 5% and that further amounts give relatively little additional benefit.

The effect of certain variations in heating times and temperatures is shown by the following example:

EXAMPLE III 10 lots, weighing 90 grams each, of a linseed ester-amide of trishydroxymethylaminomethane are treated separately with 10 grams of paraformaldehyde under varying holding times and temperatures. The following table shows the heating times to reach the different temperatures in parentheses and the holding time at these temperatures without parentheses:

*Table 2*

[Heating and holding times (in minutes).]

| Lot No. | 80° C. | 90° C. | 100° C. | 110° C. | 120° C. | 130° C. | 140° C. | 150° C. | 180° C. | 200° C. | 225° C. |
|---|---|---|---|---|---|---|---|---|---|---|---|
| 1 | (5)5 | (2)10 | (2)10 | (2)10 | (2)10 | (2)10 | (2)10 | (2)30 | | | |
| 2 | (5)5 | (2)10 | (2)10 | (2)10 | (2)10 | (2)10 | (2)10 | (2)30 | | | |
| 3 | (5)5 | (2)10 | (2)10 | (2)10 | (2)10 | (2)10 | (2)10 | (2)30 | (5)15 | | |
| 4 | (5)5 | (2)10 | (2)10 | (2)10 | (2)10 | (2)10 | (2)10 | (2)30 | (5)15 | | |
| 5 | | | (10)10 | (2)10 | (2)10 | (2)20 | (2)20 | (2)20 | | (5)15 | |
| 6 | | | (10)10 | (2)10 | (2)20 | (2)20 | (2)10 | (2)20 | | (5)15 | |
| 7 | | | (10)10 | (2)10 | (2)20 | (2)20 | (2)10 | (2)20 | | | (5)15 |
| 8 | | | (10)10 | (2)10 | (2)20 | (2)20 | (2)10 | (2)20 | | | (5)15 |
| 9 | | | | | | | | | | | (15)60 |
| 10 | | | | | | | | | | | (15)45 |

Each of the treated lots are weighed and tested for viscosity and divided into two portions. A portion of each lot is spread with drier added on glass panels and the drying time noted. The other portion of each lot is subjected to the Brown heat test for determination of the gelling properties. The results of these tests are given in the following table:

*Table 3*

| Oil From Lot No. | Weight of Oil After Treatment (Gms.) | Time to Gel at 310° C. (Minutes) | Viscosity of Oil After Treatment | Drying Time of Oil in Hours |
|---|---|---|---|---|
| 1 | 92.7 | 42 | D+ | 4 |
| 2 | 93.3 | 38 | E | 4 |
| 3 | 91.3 | 30 | C | 3½ |
| 4 | 92.3 | 27 | C+ | 3½ |
| 5 | 91.2 | 21 | C | 3 |
| 6 | 91.3 | 24 | C | 3 |
| 7 | 91.6 | 22 | C | 3 |
| 8 | 91.7 | 21 | C | 3 |
| 9 | 90.3 | 365 | B–C | 5 |
| 10 | 90.2 | 368 | C | 5 |
| Untreated Oil | | 375 | B[1] | 5 |

[1] Untreated.

From the above table it will be seen that the optimum is obtained by heating to about 200° C. or 225° C. and by raising the temperature slowly as in lot numbers 7 and 8 and not rapidly as in lot numbers 9 and 10.

Not all of the aldehydes react with the ester-amides at the same rate and some contribute greater benefit than others. The following example compares a few of them:

EXAMPLE IV

A quantity of linseed ester-amide of trishydroxymethylaminomethane is divided into 6 portions. One portion is untreated and used as a control. The other portions are treated respectively with 10% of paraformaldehyde, paraldehyde, aldol, glyoxal and formisobutyraldol. In each case the ester-amide and the aldehyde are heated in one hour at 90° C. and in the next half hour to 225° C., being maintained at 225° C. for one half hour.

The following table gives the test data for the various portions:

*Table 4*

| Portion No. | Aldehyde | Minutes to Gel at 310° C. | Viscosity (Gardner-Holdt) | Acid Value |
|---|---|---|---|---|
| 1 | Untreated | 385 | B | 9.6 |
| 2 | Paraformaldehyde | 26 | B–C | 9.8 |
| 3 | Paraldehyde | 355 | C | 9.9 |
| 4 | Aldol | 29 | C | 10.9 |
| 5 | Glyoxal | 250 | C | 14.4 |
| 6 | Formisobutyraldol | 185 | H | 12.3 |

Paraldehyde, glyoxal and formisobutyraldol are slow to react and to obtain greater benefit from these aldehydes longer heating times are beneficial.

The slower reacting aldehydes may be effectively used to treat the oil as it is being synthesized as illustrated by the following example:

EXAMPLE V 100 pounds of linseed fatty acids and 14.38 pounds of trishydroxymethylaminomethane are placed in a closed kettle. The mixture is agitated for ten minutes at approximately 70° to 80° C. to insure complete soap formation. To this mixture is added 5 pounds of formisobutyraldol. The mixture is slowly heated over three hours to 220° C. and in one hour to 230° C. The mixture is maintained at this temperature until an acid value below 10 is reached. The contents of the kettle are kept under an inert gas blanket at all times, and during the last half hour of processing inert gas is passed through the mixture. The product is now ready to be formulated into paints and varnishes or used in other ways.

Improvements of the untreated ester-amide like those shown in the foregoing examples can be demonstrated for the ester-amides of amino-hydroxy compounds other than trishydroxymethylaminomethane. However, the treated oils cannot be considered equivalent since the ester-amides themselves exhibit different degrees of quality and usefulness depending upon the particular amino-hydroxy compound employed.

Also, different degrees of quality and usefulness are obtained when using different organic carboxylic substances in reaction with the amino-hydroxy compound. As previously stated, we find that very superior drying oils can be made by using for reaction with the amino-hydroxy substances a fatty acid having double bonds in conjugated relation. Also, we find it an advantage to use for reaction with the amino-hydroxy compound an acid having a high proportion of polyenic bonds such as linoleic acid or the unsaturated acid fractions of linseed oil, soya bean oil or the like, obtained by fractional crystallization of the acids of these oils. The following table gives test results showing comparative data on the paraformaldehyde-treated ester-amides of trishydroxymethylaminomethane where different acids are used in the formation of the ester and amide groups:

Table 5

| Lot No. | Treatment of Ester-amide | Acid Used In Preparing The Ester-amide | Minutes to Gel at 310° C. | Hours to Dry | Viscosity of Oil |
|---|---|---|---|---|---|
| 1 | Untreated | Linoleic Acid | 240 | 3½ | B |
| 2 | 5% (CH₂O)ₓ | do | 22 | 3¼ | B-C |
| 3 | Untreated | Neo-Fat #19 | 179 | 2¾ | C |
| 4 | 5% (CH₂O)ₓ | do | 7 | 2¼ | I |
| 5 | Untreated | Dehydrated Castor | 96 | 3¼ | V |
| 6 | 5% (CH₂O)ₓ | do | 11 | 2¼ | W |
| 7 | Untreated | Perilla | 146 | 2¾ | A |
| 8 | 5% (CH₂O)ₓ | | 18 | 2¼ | B |

In the foregoing table the drying times are determined by adding drier and coating on glass panels as heretofore explained and the gelling time is determined by the Brown heat test at a temperature of 310° C.

In Table 5, referring to the linoleic acid ester-amide, it may be observed that the gelation time and the drying time are markedly reduced through the aldehyde reaction without substantial increase in viscosity. As to the Neo-Fat #19 acid (which is a high boiling fraction of a fish oil acid mixture) the gelation time is reduced to less than 4% as a result of the aldehyde treatment, with decreased drying time and some increase in viscosity. As to the dehydrated castor oil ester-amides the drying time is reduced by ¾ hour and as will later be explained the film from such conjugated ester-amide is extraordinarily hard and resistant to water, alkali and weathering influences.

The effect of the aldehyde treatment in the manufacture of an improved varnish is illustrated by the following example:

EXAMPLE VI

An ester-amide is prepared using 87.4% of linseed fatty acids and 12.6% of trishydroxymethyl-aminomethane, and the oil so obtained divided into 5 portions. To one portion no aldehyde treatment is given. The other four portions are treated respectively with 2%, 3%, 4% and 5% of paraformaldehyde. Each of these portions are made into varnish along with representative samples of China-wood oil, dehydrated castor oil, maleic-treated linseed oil, and linseed oil fatty acid pentaerythritol ester. These other oils include the best of the commercial drying oils including both natural and synthetic products. The formula for compounding the varnish is given as follows:

100 pounds Pentalyn-G resin,
45 gallons of the oil to be treated,
69 gallons Stanisol,
8¾ pounds of 24% lead napthenate,
1¾ pounds of 6% magnesium napthenate,
3½ pounds of 6% cobalt napthenate.

In making the varnishes the following procedure is followed:

The resin and oil are mixed and heated to 560° F. and this temperature is maintained until proper body is obtained. The mixture is cooled to 460° F. and the thinner and drier added. This procedure is followed for all oils except China-wood oil which requires a slightly different procedure for maximum benefits, due to its very rapid bodying characteristics. The China-wood oil portion is heated to 560° F. and the resin added, then the mixture is heated to 510° F., allowed to cool to 450° F., and the thinner and drier added. Data as to each of these varnishes is given in Table 6:

Table 6

| Lot No. | Oil Used to Make The Varnish | Time Required to Hold at 560° F. For Proper Body | Viscosity of Original Oil (Gardner-Holdt) | Viscosity of Varnish (50% solids) |
|---|---|---|---|---|
| | | Minutes | | |
| 1 | Ester-amide (untreated) | 180 | B | E |
| 2 | Ester-amide+2% aldehyde | 129 | B-C | E |
| 3 | Ester-amide+3% aldehyde | 72 | B-C | D |
| 4 | Ester-amide+4% aldehyde | 53 | C | E-F |
| 5 | Ester-amide+5% aldehyde | 31 | C | D |
| 6 | China-wood oil | | G-H | E |
| 7 | Maleic-treated Linseed Oil | 47 | Y | D |
| 8 | Dehydrated Castor Oil | 41 | X | D-E |
| 9 | Linseed Pentaerythritol Ester | 127 | L-M | D-E |

From the above table it may be seen that the aldehyde treatment substantially shortens the time required to hold at 560° F. to produce the required body, thus enabling a varnish to be made more rapidly. Although China-wood oil bodies faster than any other oil, the ester-amides treated with 5% aldehyde are faster bodying than any of the other synthetic oils tested.

A varnish which dries rapidly to a tack-free hard film is more valuable than the varnishes which remain tacky and soft for long periods. The following table shows the drying rate of the varnishes prepared as above described and also the resistance of these varnishes to hot water, cold water and 2% sodium hydroxide solution:

exposure. The aldehyde-treated ester-amide oil blue and black enamels exhibit no bronzing after one year's exposure while all of the blue and Table 7

| Lot No. | Oil Used in Making 45 Gallons Oil Length Varnish | Time to Dry Tack-free to Aluminum Foil | Tests on 72 Hour Films | | Time for Failure of Film in 2% NaOH |
|---|---|---|---|---|---|
| | | | Effect of Water at 25° C. for 72 Hours | Effect of Water at 100° C. for 5 Hours | |
| | | Hours | | | Minutes |
| 1 | Ester-amide (untreated) | 10¼ | OK | Slight Blister | 125 |
| 2 | Ester-amide+2% aldehyde | 8½ | OK | do | 450 |
| 3 | Ester-amide+3% aldehyde | 7 | OK | OK | 820 |
| 4 | Ester-amide+4% aldehyde | 6½ | OK | OK | 1,020 |
| 5 | Ester-amide+5% aldehyde | 5½ | OK | OK | 1,260 |
| 6 | China-wood Oil | 7¾ | OK | OK | 820 |
| 7 | Maleic-treated Linseed Oil | 30 | OK | OK | 30 |
| 8 | Dehydrated Castor Oil | 36 | Slight Cloud | Opaque | 40 |
| 9 | Linseed Pentaerythritol Ester | 30 | do | Blushed | 60 |

The following table shows the hardness of these varnishes after drying as measured by the Sward-Hardness-Rocker. This table also shows the relative condition of the varnish films after they have been exposed to weather for six months:

black enamels made from the other oils including China-wood oil show substantial bronzing.

In the white enamels using Titanox A pigment the 5% aldehyde-treated ester-amine enamels dry faster than any of the enamels made Table 8

| Lot No. | Oil Used In Making 45 Gallons Oil Length Varnish | Rocker Hardness | | | Condition of Film After Six Months Summer Exposure |
|---|---|---|---|---|---|
| | | 7 Day Film | 14 Day Film | 21 Day Film | |
| 1 | Ester-amide (untreated) | 32 | 32 | 32 | Fair. |
| 2 | Ester-amide+2% aldehyde | 34 | 36 | 36 | Good. |
| 3 | Ester-amide+3% aldehyde | 38 | 38 | 38 | Do. |
| 4 | Ester-amide+4% aldehyde | 44 | 44 | 44 | Excellent. |
| 5 | Ester-amide+5% aldehyde | 46 | 48 | 46 | Do. |
| 6 | China-wood Oil | 36 | 34 | 34 | Good. |
| 7 | Maleic-treated Linseed Oil | 28 | 32 | 32 | Do. |
| 8 | Dehydrated Castor Oil | 10 | 16 | 18 | Poor. |
| 9 | Linseed Pentaerythritol Ester | 24 | 38 | 32 | Fair. |

From the above tables it is apparent that the aldehyde-treated ester-amide oil is superior to the untreated oil and that the amount of the improvement up to 5% of aldehyde is directly related to the proportion of aldehyde used in treating the ester-amide. Also, it will be apparent that the aldehyde-treated ester-amides above tested show marked improvement over China-wood oil.

The foregoing Tables 7 and 8 describe varnish films involving unconjugated ester-amides.

Although the aldehyde-treated unconjugated compositions show an improvement over any other known oils in hardness, drying time, resistance to water and alkali and durability under exposure, the aldehyde-treated conjugated ester-amides such as those prepared using dehydrated castor oil show marked improvement over the unconjugated compounds in these important characteristics.

The manufacture of enamels is illustrated by the following example:

EXAMPLE VII

The varnishes prepared in Example VI are ground and made into enamels using (A) Titanox A pigment, (B) Germantown Lamp Black pigment and (C) Chinese Blue pigment. These enamels are tested for drying characteristics and durability. Wood panels are painted with the enamels immediately after the varnishes are ground, and the panels are subjected to outside from the other oils and on exposure show better gloss and color retention than any of the other enamels tested except the enamel made from dehydrated castor oil. The dehydrated castor oil enamel shows color retention equal to the ester-amide oil but it loses gloss and the film collects dirt excessively.

In the blue enamels the ester-amide oils are the only ones tested which are non-reactive with the pigment. The China-wood oil enamel continually gains viscosity and the maleic-treated linseed oil enamel tends to become stringy after one month in the can.

We have further found that by reacting an ester-amide of an amino-hydroxy compound with an aldehyde in the presence of a phenolic body it is possible to prepare an improved resinous composition. The aldehyde, phenol and ester-amide oil condense simultaneously to form a resinous product. A specific example of this practice is given as follows:

EXAMPLE VIII

A mixture of 40 grams of paraformaldehyde and 200 grams of linseed ester-amide of trishydroxymethylaminomethane is heated with agitation to 80° C. and is held ½ hour. 100 grams of p-phenylphenol and 5 grams of hexamine are added. The mixture is heated to 100° C. in ½ hour and held ½ hour at this temperature. The temperature is then advanced to 110° C. to 120° C. and 130° C. using ½ hour to attain each temperature. The temperature is maintained at 130° C. for ½ hour and in the next hour is advanced to 285° C. where it is held for 15 minutes. The resinous mass is allowed to cool to 175° C. and is poured into 320 grams of Stanisol. To this is added 5 grams of 24% lead napthenate, 2 grams of 6% cobalt napthenate and 1 gram of 6% manganese napthenate. A film of this is poured and is found to dry to a tack-free stage in 5 hours.

This type of procedure is further demonstrated by the fololwing example:

EXAMPLE IX 90 grams of phenol, 50 grams of paraformaldehyde and 25 grams of the ester-amide of trishydroxymethylaminomethane and linseed acids are mixed with 100 grams of butanol. The mixture is warmed and to it is added 1 gram of sodium hydroxide. This mixture is heated to 100° C. with agitation. After two hours of heating a syrupy product results. Strips of cloth dipped into this syrup are dried and the dried strips moulded in a press at 150° C. for 20 minutes. A hard, tough, laminated sheet is formed.

The ester-amides of amino-hydroxy compounds may also be combined with an aldehyde and with various other substances such as analine, furfural, urea and acetone to yield useful products.

Another modification of our invention deals with the treatment of an ester-amide of an amino-hydroxy compound with acrolein, acrolein being a special unsaturated aldehyde. The resinous product so produced has very unique properties. An example of the procedure is given as follows:

EXAMPLE X

A mixture of 90 grams of 99% glycerol and 10 grams $KHSO_4$ is heated to 125° C., the glycerol dehydrates to form $CH_2=CH-CHO$, and two molecules of water. The water is substantially removed by passing this gaseous mixture through condensers which are maintained at 60° C. and then over a drying agent. It is important to maintain the temperature of the condensers at between 55° and 60° C. since acrolein condenses at 52° C.

The ester-amide of trishydroxymethylaminomethane and linseed fatty acid is warmed to 80° C. and the acrolein is bubbled through the oil under constant agitation. The acrolein is charged into the oil until the weight of the oil is increased 10%. This represents a slight excess in the amount needed to react with all the amide linkages present in the ester-amide. The acrolein-treated ester-amide oil is then slowly heated over a period of one hour to 175° C. and then in an additional ½ hour to 200° C.

Strips of cloth are dipped into a 5% sodium carbonate solution and allowed to dry, thereby causing a deposit of an alkaline residue on the surface of the cloth fibers. The treated cloth is dipped into the acrolein-treated ester-amide oil and allowed to drain. The strips of cloth are laid together and heated in a press at 150° C. for one hour. The resulting product is a flexible, tough sheet.

Another modified way in which our invention may be practiced is to first form the ester-amide of the amino-hydroxy compound into a coating composition and then treat such coating composition with the aldehyde. A specific example demonstrating this procedure is as follows:

EXAMPLE XI

A varnish is made using the maleic-treated pentaerythritol ester of rosin and an untreated linseed ester-amide of trishydroxymethylaminomethane, and the calculated amount of paraformaldehyde is added to the cold varnish. The varnish and aldehyde mixture is placed on a steam or hot water bath and this mixture is heated to 80° C. The mixture is maintained at 80° C. for ½ hour which initiates the reaction of the aldehyde with the ester-amide component in the varnish. This treated varnish may be coated on wood or metal and over an extended period of time the reaction between the aldehyde and the ester-amide goes on to completion. The resulting varnish film is just as resistant to water, alkali and outside exposure as is the varnish made from the oil which was treated with aldehyde prior to its preparation as a varnish. This extended period of time required to complete the reaction between the aldehyde and the ester-amide oil component of the varnish may be materially shortened if the coated panel is subjected to infra-red rays as from the hot summer sun. In this case reaction is complete in but a few hours. In case the varnish so prepared is used as a baking varnish, the baking operation completes the reaction between the ester-amide oil component of the varnish and aldehyde.

Following is another procedure which is very effective where an enamel is to be used in connection with a primer coating especially on metal surfaces or the like. A primer coating may consist, for example, of a mixture of alkyd resin, varnish, lead or zinc chromate pigments and thinners, the zinc chromate pigments possessing an unusual affinity for metallic surfaces. Using as the varnish an ester-amide of an amino-hydroxy compound, the ester-amide oil may be treated before it is applied in the primer coating with aldehyde in accordance with the practices hereinbefore set forth. The coated metal is then baked for ½ hour at 100° C. and this promotes the first part of the reaction involving the treatment of the amide linkage.

A baking enamel applied over the primer coating may consist of a mixture of pigment, varnish and strong solvents, the purpose of the strong solvents being to partially dissolve the surface of the primer so that the enamel coat will adhere tenaciously to the primer. Using an ester-amide of an amino-hydroxy compound as the varnish in the baking enamel, this ester-amide may be treated using an aldehyde in the manner heretofore outlined, prior to its being applied in the enamel on the primer coating. After the enamel has been applied the coated object is then baked for ½ hour at 90° C. and for one hour at 150° C. This causes the reaction between the aldehyde and the ester-amide oil in both the primer coat and in the enamel coating to be completed.

By this practice we effect not only a good anchorage of the enamel coat on the primer coating by partial solution of the primer coated surface but we effect a chemical linkage between the varnish in the enamel coat and the varnish in the primer coat. The initial reaction between the aldehyde and the amide group is believed to be that of addition prior to the application of the coatings to the surface and that of condensation upon application of the baking temperatures above 150° C. So far as we are aware, no drying composition heretofore known is capable of such chemical anchorage between coatings.

Another modification of our invention involves the improvement of washability in water emulsion paints. Varnish is commonly used in water emulsion paints and if the varnish component of such paints is made from an untreated ester-amide of an amino-hydroxy compound it is desirable to add to the emulsion paint aqueous formaldehyde. This treatment does not alter the drying speed of the paint, but after the formaldehyde has completed its action upon the amide linkage the washability of the paint is greatly improved. However, since the water emulsion paints contain a substantial quantity of protein material such as casein or glue, the aldehyde should be added to the paint immediately before it is to be used; otherwise the protein tends to tan and set up. Although the addition of formaldehyde to water emulsion paints made from the other than ester-amides contributes a slight improvement in the washability of the dried paint, this improvement is substantially greater where there is opportunity for reaction between the aldehyde and the amide group of the ester-amide ingredient.

We have further found that where ester-amides of amino-hydroxy compounds are to be improved through aldehyde treatment it is better not to employ catalysts such as calcium hydroxide, lead oxide, magnesium oxide or the like to aid in the esterification of the amino-hydroxy compound and the organic carboxylic substance. It appears that the ester-amide oils prepared by the use of such catalysts act differently on treatment with aldehydes. Where even catalytic amounts of such basic substances are present the aldehyde-treated ester-amide oils are likely to have a burnt sugar odor and be quite dark. Such odor and color characteristics may be avoided by omitting the use of such catalysts in the esterification step in the formation of the ester-amide oil, or by removing such catalysts prior to the aldehyde treatment.

The improvements characteristic of our invention in the aldehyde treatment are obtained only in connection with an ester-amide. In the case of esters normally used in the production of coating compositions such as China-wood oil, linseed pentaerythritol ester, linseed oil, etc. where no amide grouping is present, the treatment with an aldehyde fails to contribute any material improvement. In the case of such oils the aldehyde treatment is found upon test to neither injure nor substantially improve these oils.

It is understood that the specific procedures and products herein described have been given only for the purpose of illustration and explanation and that the improvements may be practiced in widely differing forms, all within the spirit of the invention.

We claim:

1. The reaction product of acrolein and an ester-amide of an amino hydroxy compound.

2. A process comprising contacting an ester-amide of an amino hydroxy compound with acrolein at a temperature of at least 130° C.

3. As a new composition of matter, a coating material made by heating an organic carboxylic substance with an amino-hydroxy compound at a temperature in excess of 150° C., continuing said heating until the carboxylic substance has esterified at least one of the hydroxy groups and also reacted with at least one of the amino groups, and then heating the compounds thus formed with a compound selected from the group consisting of aldehydes and aldehyde polymers at a temperature in excess of 150° C., the temperature being maintained above 150° C. until a final reaction product is formed which contains an ether linkage, an ester group, and a structure selected from the group consisting of

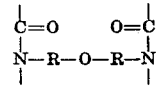

and

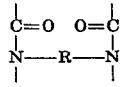

wherein R is the organic radical of the aldehyde.

4. As a new composition of matter, a coating material made by heating an organic carboxylic substance having an unsaturated conjugated carbon chain with an amino-hydroxy compound at a temperature in excess of 150° C., continuing said heating until the carboxylic substance has esterified at least one of the hydroxy groups and reacted with at least one of the amino groups, and then heating the compound thus formed with a compound selected from the group consisting of aldehydes and aldehyde polymers at a temperature in excess of 150° C.

5. As a new composition of matter, a coating material made by heating the fatty acids of dehydrated castor oil with trishydroxymethyl-aminomethane at a temperature in excess of 150° C., continuing said heating until the fatty acids have esterified at least one of the hydroxy groups and reacted with the amino group, and then heating the compound thus formed with a compound selected from the group consisting of aldehydes and aldehyde polymers at a temperature in excess of 150° C.

6. As a new composition of matter, a coating material made by heating the fatty acids of dehydrated castor oil with trishydroxymethyl-aminomethane at a temperature in excess of 150° C., continuing said heating until the fatty acids have esterified at least one of the hydroxy groups and reacted with the amino group, and then heating the compound thus formed with paraformaldehyde at a temperature in excess of 150° C., the temperature being maintained above 150° C. until a final reaction product is formed which contains an ether linkage, an ester group, and a structure selected from the group consisting of

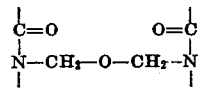

and

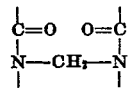

7. A process for producing a coating composition comprising contacting the product of reaction between the fatty acids of dehydrated castor oil and trishydroxymethylaminomethane with paraformaldehyde at a temperature in excess of 150° C.

8. A process for producing a coating composition comprising contacting the product of reaction between an organic carboxylic substance and an aminohydroxy compound with a compound selected from the group consisting of aldehydes and aldehyde polymers at a temperature in excess of 150° C.

WESLEY A. JORDAN.
SYDNEY H. SHAPIRO.

REFERENCES CITED

The following references are of record in the file of this patent:

UNITED STATES PATENTS

| Number | Name | Date |
|---|---|---|
| 2,131,362 | Baldwin et al. | Sept. 27, 1938 |
| 2,185,817 | Mauersberger | Jan. 2, 1940 |
| 2,186,464 | Mauersberger | Jan. 9, 1940 |
| 2,238,640 | Hanford | Apr. 15, 1941 |
| 2,238,928 | Cahn et al. | Apr. 22, 1941 |
| 2,276,309 | Hummel et al. | Mar. 17, 1942 |
| 2,322,310 | Muskat et al. | June 22, 1943 |
| 2,345,013 | Soday | Mar. 28, 1944 |
| 2,354,579 | De Groote et al. | July 25, 1944 |
| 2,373,250 | Lycan et al. | Apr. 10, 1945 |
| 2,398,569 | Widmer | Apr. 16, 1946 |
| 2,430,907 | Cairns | Nov. 18, 1947 |
| 2,430,923 | Foster et al. | Nov. 18, 1947 |